UNITED STATES PATENT OFFICE.

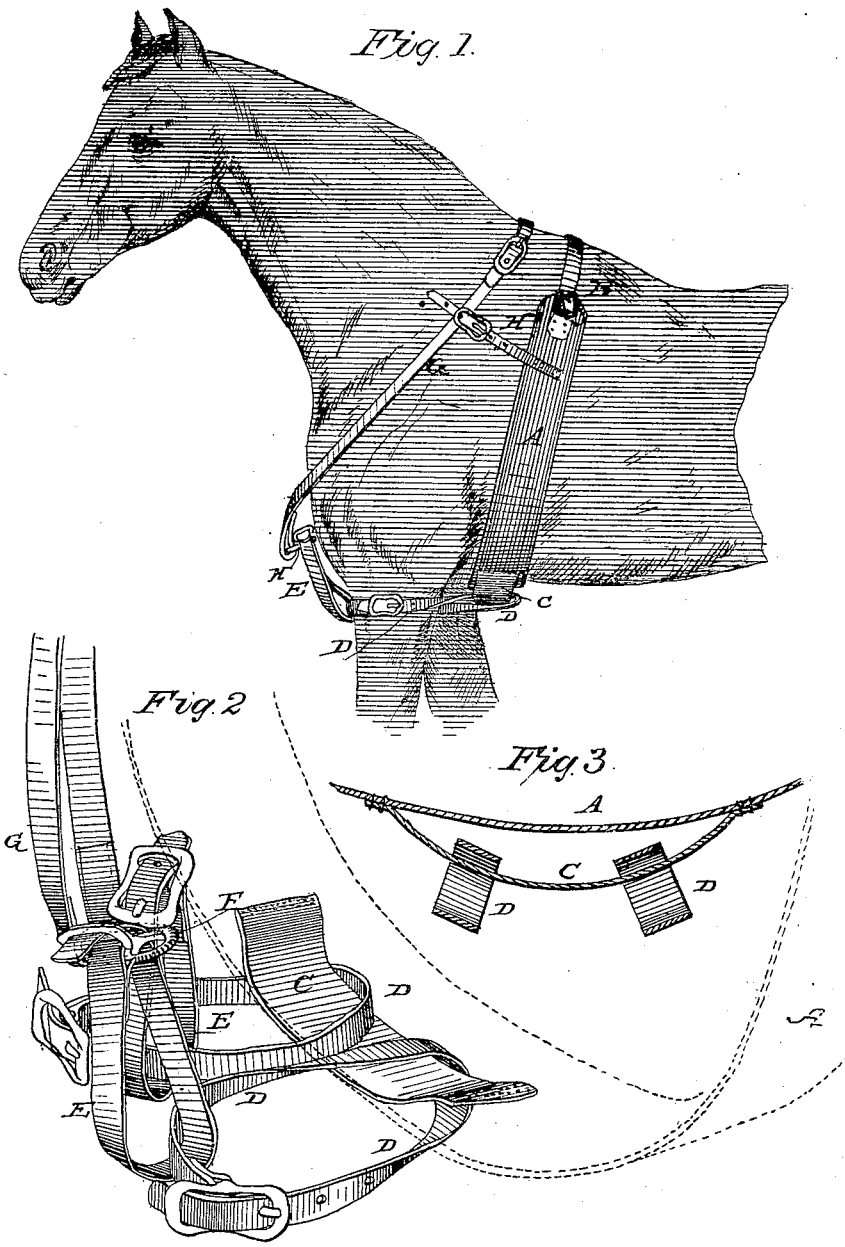

DANNIEL T. WARREN, CHESTNUT RIDGE, TENNESSEE.

HOPPLE.

SPECIFICATION forming part of Letters Patent No. 265,351, dated October 3, 1882.

Application filed June 8, 1882. (No model.)

To all whom it may concern:

Be it known that I, DANNIEL THOMAS WARREN, of Chestnut Ridge, in the county of Lincoln and State of Tennessee, have invented certain new and useful Improvements in Hopples; and I do hereby declare that the following is a full, clear, and exact description of the invention, which will enable others skilled in the art to which it appertains to make and use the same, reference being had to the accompanying drawings, which form a part of this specification.

The invention relates to hopples for horses and the like, and has for its object to provide a simple, inexpensive, and efficient device. To this end it consists in certain improvements in the construction and operation of the same.

In the drawings, Figure 1 is a perspective view of the hopple applied to a horse; Fig. 2, a like view of the device detached, and Fig. 3 is a detail view.

Referring by letter to the drawings, A designates a girt or belly-band, which is adjusted around the body of the horse and fastened at the top, as at B. C is a reenforce or strap secured at its ends to the under side of girt A, and D D are straps which buckle around the latter, between it and strap C, and are adapted to be buckled around the fore legs of the animal. Straps D D are connected by two cross-straps, E E, which pass through a central ring or loop, F, to which latter is secured a strap, G, adapted to extend up and be buckled around the neck of the animal, as shown. The girt A is provided on one side, near the top, with a strap, H, adapted to extend forward and be secured to strap G, to retain the whole in position.

The operation and advantages of my invention will be readily understood. It can be readily and conveniently secured on the animal, as shown in Fig. 1, and is very efficient in the purpose for which it is designed.

I claim and desire to secure by Letters Patent—

The combination, with the belly-band carrying the leg-straps D D, which are connected by loops or straps E E to prevent separation, and the neck-strap G, extending from the point of juncture of the latter, of the retaining and securing cross-strap H, substantially as set forth.

In testimony that I claim the foregoing as my own I have hereto affixed my signature in presence of two witnesses.

DANNIEL THOMAS WARREN.

Witnesses:
J. B. HILL,
J. D. McKINNEY.